United States Patent
Burguera Albizuri et al.

(10) Patent No.: US 9,389,633 B2
(45) Date of Patent: Jul. 12, 2016

(54) MOTOR VEHICLE PEDAL COUPLING APPARATUS AND METHOD

(71) Applicant: BATZ, S.COOP., Igorre (ES)

(72) Inventors: Fernando Burguera Albizuri, Bilbao (ES); Lander Llona Furundarena, Lezama (ES); Javier Salvador Delgado, Galdakao (ES); Egoitz Anzola Artabe, Bilbao (ES); Peru Arrillaga Elcoro, Lekeitio (ES); Jon Menique Ezquerra, Bilbao (ES)

(73) Assignee: Batz, S. Coop., Igorre (ES)

( * ) Notice: Subject to any disclaimer, the term of this patent is extended or adjusted under 35 U.S.C. 154(b) by 202 days.

(21) Appl. No.: 13/680,035

(22) Filed: Nov. 17, 2012

(65) Prior Publication Data
US 2013/0133472 A1 May 30, 2013

(30) Foreign Application Priority Data
Nov. 30, 2011 (ES) .................... 201131942

(51) Int. Cl.
*G05G 1/44* (2008.04)
*G05G 1/50* (2008.04)

(52) U.S. Cl.
CPC .................. *G05G 1/44* (2013.01); *G05G 1/506* (2013.01); *Y10T 74/20888* (2015.01)

(58) Field of Classification Search
CPC ........... G05G 1/46; G05G 1/44; G05G 1/445; G05G 1/30; G05G 1/50; G05G 1/506
USPC ............ 74/512–514, 450; 411/901, 900, 424, 411/395, 351
See application file for complete search history.

(56) References Cited

U.S. PATENT DOCUMENTS

| 793,754 A | * | 7/1905 | Weber .......................... 174/167 |
| 983,451 A | * | 2/1911 | Kennedy ...................... 411/80.5 |
| 4,718,801 A | * | 1/1988 | Berecz .......................... 411/378 |
| 4,819,500 A |   | 4/1989 | Musumiya et al. |

(Continued)

FOREIGN PATENT DOCUMENTS

| DE | 10336799 A1 | * | 3/2005 |
| DE | 102007016983 A1 | * | 12/2007 |

(Continued)

OTHER PUBLICATIONS

JPO Machine Translation of Claims and Detailed Description of JP 201134428 A, Hiura, Feb. 17, 2011.*

(Continued)

*Primary Examiner* — Daniel Yabut

(57) ABSTRACT

A pedal apparatus for a motor vehicle that includes a support piece adapted to be fixed to a part of the motor vehicle. According to one implementation the pedal apparatus includes a shaft having a plastic body having a first end portion, a second end portion and a central portion disposed between the first and second end portions, each of the first and second end portions being supported on the support piece. The shaft also includes a metal body disposed on an exterior surface of the central portion of the plastic body. A pedal with a hollow bushing at one end is arranged on the shaft with an interior surface of the hollow bushing being supported on an external surface of the metal tube, the dimensional characteristics of the hollow bushing and metal tube permitting the hollow bushing to rotate about the shaft.

20 Claims, 3 Drawing Sheets

(56) References Cited

U.S. PATENT DOCUMENTS

| | | | | |
|---|---|---|---|---|
| 4,824,314 | A | * | 4/1989 | Stencel .................... 411/378 |
| 5,983,746 | A | * | 11/1999 | Nawata et al. ................. 74/512 |
| 8,038,375 | B2 | * | 10/2011 | Kohan et al. ................. 411/80.5 |
| 2012/0137823 | A1 | * | 6/2012 | Kim et al. ...................... 74/560 |

FOREIGN PATENT DOCUMENTS

| EP | 1609035 | B1 | | 9/2006 |
|---|---|---|---|---|
| ES | 2273244 | T3 | | 5/2007 |
| FR | 2796012 | A1 | * | 1/2001 |
| JP | 2011034428 | A | * | 2/2011 |
| WO | WO 2004/088149 | A2 | | 10/2004 |

OTHER PUBLICATIONS

EPO Translation of Description of DE 10336799 A1, Schulte et al., Mar. 10, 2005.*

EPO Translation of the Description of FR 2796012 A1, Rouviere, Jan. 12, 2001.*

* cited by examiner

MOTOR VEHICLE PEDAL COUPLING APPARATUS AND METHOD

CROSS-REFERENCE TO RELATED APPLICATIONS

This application relates to and claims the benefit and priority to Spanish Patent Application No. P201131942, filed Nov. 30, 2011.

TECHNICAL FIELD

The invention relates to a coupling device for a motor vehicle pedal, by means of which the pedal is coupled to a support piece that is itself fixed to the motor vehicle.

BACKGROUND

There are various known devices for fixing the pedal to a support piece of the pedal. U.S. Pat. No. 4,819,500 describes a pedal that is fixed to a support piece that is attached to a motor vehicle. The pedal being fixed between two substantially parallel walls of the support piece by means of a shaft that passes through the pedal. The shaft is fixed to the support piece by means of a screwed connection, by a threaded bolt that passes longitudinally through the shaft.

For the purpose of obtaining an inexpensive and rapid fitting system that minimizes the assembly and detachment operations, Spanish Patent No. 2,273,244 T3 describes a shaft made of a plastic material, which is inserted axially in a support, passing through the support and the pedal. Once inserted it is rotated in relation to the support to a locking position. To achieve this, the shaft comprises a headstock that includes elastic clips that are locked with the support.

In French Publication No. 2796012A1 the shaft is made of a plastic material and fixed to a support by rapid coupling means. The rapid coupling means comprise projections on the outer wall of the support and stoppers on a head of the shaft, the stoppers respectively collaborating with the projections to fix and lock the shaft in relation to the support.

In the prior art there are known shafts of rotation made solely of plastic, in particular of polyamide or similar plastics, which are very rigid and resistant to cutting. One problem associated with hygroscopic plastics such as polyamide is the changes caused to their shape as a result of the temperature and/or moisture levels to which the materials are subjected. When they reach high temperatures and/or moisture levels shafts made of polyamide or similar plastics absorb moisture and become enlarged. As a result, the members that collaborate with the shafts are designed with lots of play, which negatively affects the accuracy of the rotary movement of the pedal in relation to the shaft and the effective transmission of stresses towards the support piece.

SUMMARY OF THE DISCLOSURE

According to one implementation a coupling device of a pedal is provided that comprises a shaft that passes through the pedal and the support piece, fixing the pedal to the support piece. The shaft comprises a plastic body and a metal tube arranged substantially coaxially to the plastic body on the exterior of the plastic body. The pedal is arranged supported on the metal tube and the metal tube is itself arranged supported on the support piece.

The metal tube supports most of the mechanical stresses to which the coupling device is subjected while the pedal is operating. In particular, the metal tube supports the shearing and flexion stresses that are caused. As a result, the plastic body may be made of a plastic material whose mechanical requirements relating to rigidity and an ability to be cut are less constrained than it would otherwise be if the shaft were made solely of plastic. As a result, the cost of materials is reduced. In addition, the body does not present the hygroscopicity problems known in the prior art for shafts made solely of plastic, which must meet the mechanical requirements demanded of motor vehicle pedals.

The metal tube is combined with the plastic body to provide a coupling device that weighs less than it would if made entirely of a metal material. It is also cheaper. Additionally, hygroscopicity problems may be avoided if a non-hygroscopic plastic is chosen. In addition, a coupling device with high resistance to overloads is obtained, which is not possible with the plastic shafts known in the prior art.

Furthermore, the metal tube thus maintains a simple shape, while the plastic body may adopt a complex shape given the fact that, as it is made of plastic, manufacturing the body with the shape is much simpler and cheaper than doing so with metal. Reduced tolerances of the coupling device are obtained due to the reduced tolerances that may be obtained in the metal tube, as opposed to in a shaft made exclusively of plastic, in which the tolerances are greater, depending on the injection process. In this way, proper transmission of the rotary movement of the pedal in relation to the shaft is obtained, as well as effective transmission of the loads of the pedal to the support piece through the metal tube, with the plastic body suffering in a minimal manner.

These and other advantages and characteristics will be made evident in the light of the drawings and the detailed description thereof.

DETAILED DESCRIPTION

Figure 1:
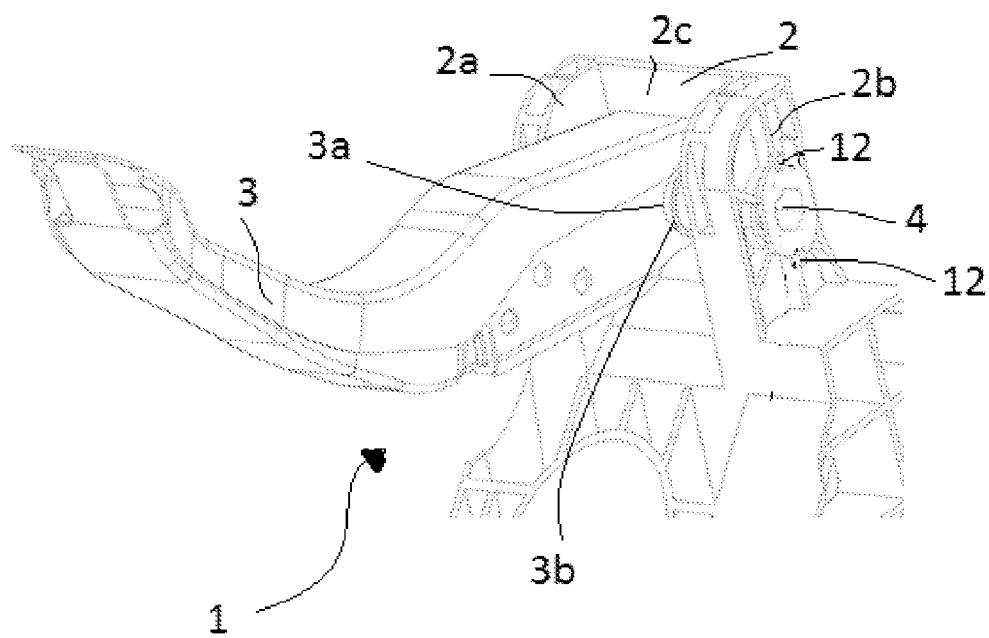
FIG. 1 shows a view in perspective of a pedal unit that comprises a pedal coupled to a support piece by a coupling device according to an implementation.
Figure 2:
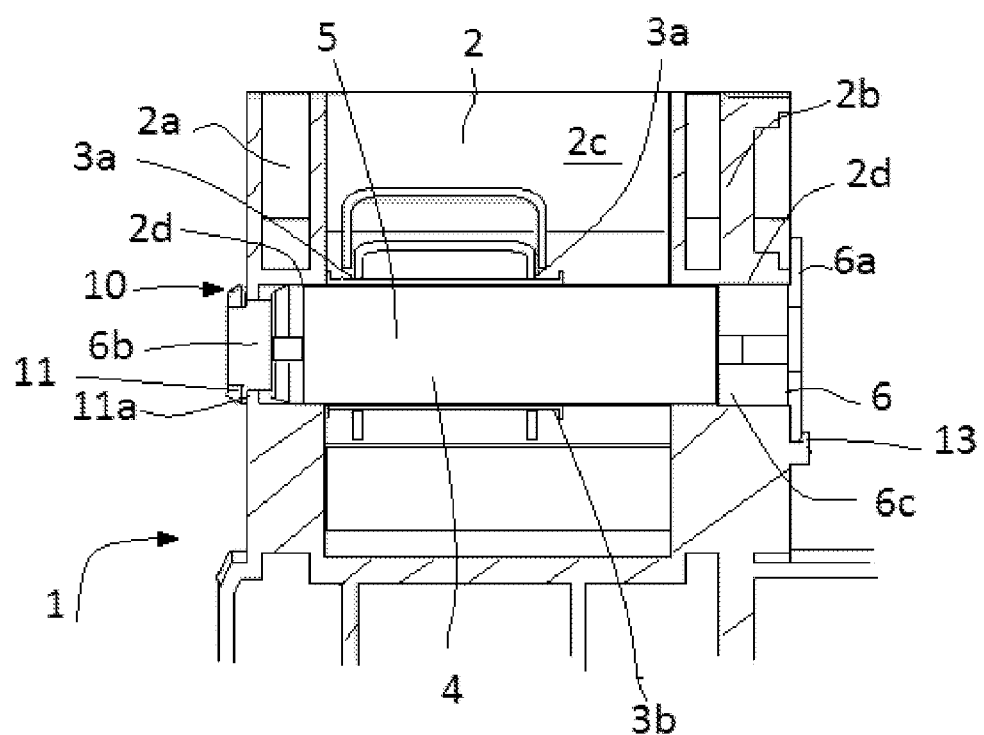
FIG. 2 shows a sectional view of a pedal coupled to a support piece.
Figure 3:
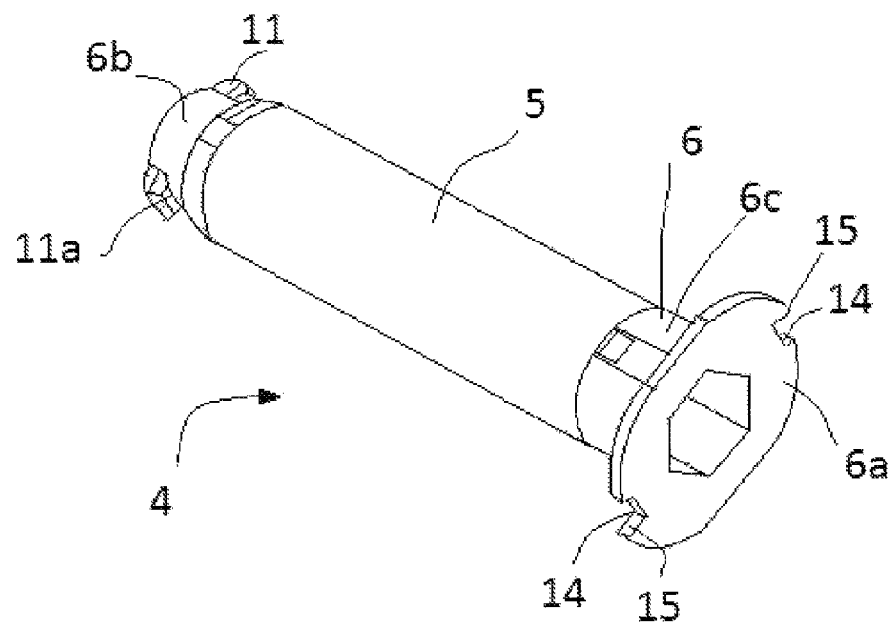
FIG. 3 shows a side view of the coupling device shown in FIG. 2.

FIG. 1 shows a pedal unit 1 according to one implementation that comprises a pedal 3 for motor vehicles that is arranged coupled to a support piece 2 by a coupling device.

The pedal 3 comprises holes 3a that are passed through by a bushing member 3b, the bushing member 3b being arranged fixed to the pedal 3. The support piece 2 comprises walls 2a,2b arranged substantially parallel to each other, which define a housing 2c in which is arranged housed the pedal 3. Each wall 2a,2b comprises a hole 2d, the holes 2d of the walls 2a,2b being arranged substantially coaxially.

The coupling device comprises a shaft 4 that passes through the bushing member 3b of the pedal 3 and the walls 2a,2b of the support piece 2 through the holes 2d, fixing the pedal 3 to the support piece 2.

The shaft 4 comprises a plastic body 6 and a metal tube 5 that surrounds the plastic body 6 externally. The plastic body 6 and the metal tube 5 are connected. The pedal 3 is arranged coupled to and supported on the metal tube 5, the pedal 3 being capable of rotating in relation to the metal tube 5. The metal tube 5 is supported on the walls 2a,2b, it being supported on delimiting surfaces of the respective holes 2d. As a result, the load/tensions of the pedal 3 are transmitted to the metal tube 5, which itself transmits them to the support piece 2. The plastic body 6 positions the shaft 4 in relation to the support piece 2, participating less in the transmission of forces than would otherwise occur absent the presence of the metal tube 5.

In one implementation the metal tube 5 is made of steel. However, the metal tube 5 may be made of many other types of metals.

According to some implementations the plastic body 6 is made of a non-hygroscopic plastic, for example polyethylene, polyoxymethylene or polypropylene, with or without fibre. As a result, the additional advantage is achieved of using plastics that are not deformed perceptibly if high temperatures or moisture levels are reached.

The plastic body 6 comprises a central part 6c that extends longitudinally along the metal tube 5, it being arranged in contact with the metal tube 5, a head 6a that extends continuous to the central part 6c, and an end 6b that extends continuous to the central part 6c in a direction opposite to the head 6a. The head 6a and the end 6b project out in relation to the metal tube 5. The plastic body 6 is substantially cylindrical and hollow.

In some implementations the shaft 4 comprises fixing means arranged on the plastic body 6 to prevent the axial movements of the shaft 4 in relation to the support piece 2. The fixing means comprises at least one projection 11 that projects out radially from an external surface of the end 6b.

In some implementations the fixing means comprise two projections 11 arranged diametrically to each other. The end 6b of the plastic body 6 passes through the walls 2a,2b of the support piece 2 through the corresponding holes 2d, each wall 2a,2b including recesses not shown in the figures, which extend continuous to each hole 2d, radially towards the exterior, to allow the passage of the projections 11 of the plastic body 6. In some implementations each projection 11 comprises a substantially flat surface 11a, substantially orthogonal to the axis of the plastic body 6 and arranged facing the head 6a. Once the shaft 4 is fitted in the support piece 2, the head 6a, greater in size than the holes 2d of the support piece 2, and the projections 11 are arranged externally to the support piece 2, with the result that the surface 11a of the respective projection 11 comes up against one of the walls 2a of the support piece 2 and the head 6a against the other wall 2b of the support piece 2.

Additionally, the coupling device comprises locking means that cooperates with the support piece 2 to lock the rotation of the shaft 4 in relation to the support piece 2, preventing its release. In some implementations the locking means 12 comprises housings 14 in the plastic body 6, each one of which collaborates with a respective tab 13 to lock the shaft 4 in the support piece 2.

In some implementations two housings 14 are provided arranged diametrically opposed on the perimeter of the head 6a and pass longitudinally through the head 6a. Each housing 14 is delimited by a limiting surface 15 that projects out radially in relation to the rest of the delimiting surfaces of the housing 14. In some implementations the limiting surfaces 15 are substantially flat. For their part, in some implementations the support piece 2 comprises two tabs 13 arranged facing each other, diametrically opposing on the perimeter of the hole 2d of the wall 2b.

The housings 14 are arranged in such a way that when the shaft 4 is inserted in the support piece 2 through the holes 2d, the shaft 4 is rotated until the limiting surface 15 of the corresponding housing 14 comes up against the tab 13 of the corresponding support piece 2, the tabs 13 being housed in the position at least partly in the respective housings 14 of the plastic body 6, locking the shaft 4. To release the shaft 4 the shaft 4 merely has to be rotated in an opposite direction.

In the implementation shown in FIGS. 1 to 4, the plastic body 6 is arranged over-injected inside the metal tube 5. The over-injection is performed by means known in the prior art, and a description is not considered necessary. The central part 6c projects out in relation to the metal tube 5 in both directions.

Figure 4:
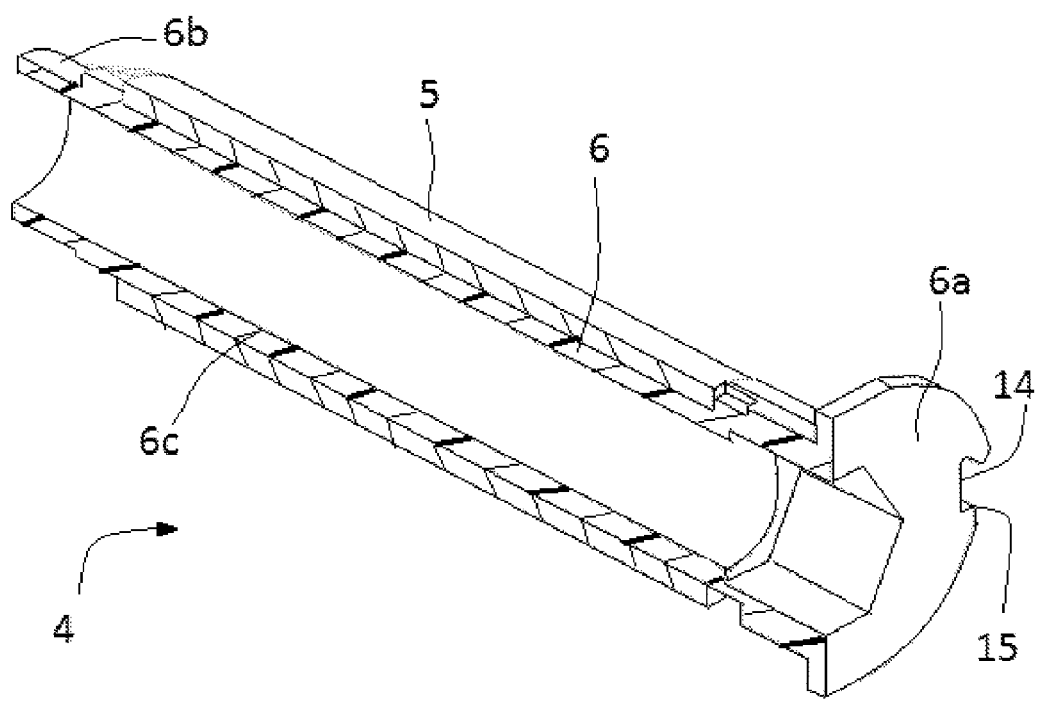
FIG. 4 shows a longitudinal section of the coupling device shown in FIG. 3.
Figure 5:
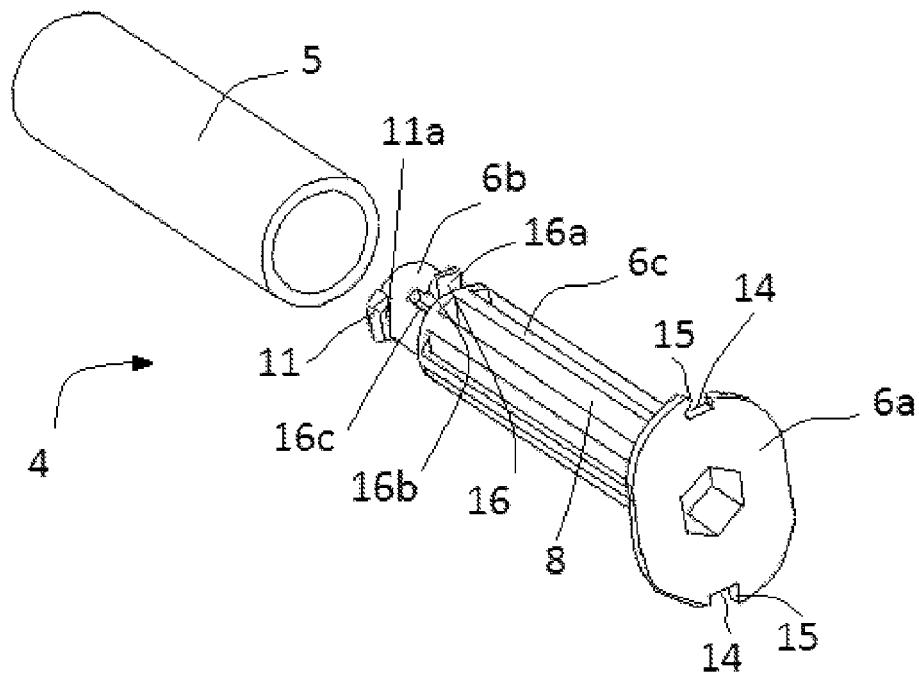
FIG. 5 shows a side view of another implementation of the coupling device shown in FIG. 1.

In the implementation shown in FIGS. 4 and 5 the plastic body 6 is formed by plastic injection separately to the metal tube 5. The metal tube 5 is then tightly secured to the plastic body 6. The metal tube 5 is arranged coaxial and external to the plastic body 6.

In the implementation shown in FIGS. 4 and 5 the plastic body 6 is cylindrical and hollow. The plastic body 6 comprises the central part 6c, the head 6a that extends continuous to the central part 6c, and the end 6b that extends continuous and opposite the head 6a. Both the means of fixing and the means of locking the shaft 4 to the support piece 2 are similar to the fixing and locking means described above.

The plastic body 6 also comprises in the central part 6c gaps 8 that extend longitudinally along the central part 6c, substantially parallel to each other, along the contour of the central part 6c. The gaps 8 allow the plastic body 6 to be injected in a simpler way.

In order to fix the metal tube 5 in relation to the plastic body 6, the plastic body 6 comprises a retention member 16 arranged on one end of the central part 6c. The retention member 16 extends radially, towards the exterior of the plastic body 6. The retention member 16 comprises a substantially flat surface 16a that is arranged facing a base 6d of the head 6a, with the metal tube 5 supported and retained between the base 6d and the surface 16a of the retention member 16.

Figure 6:
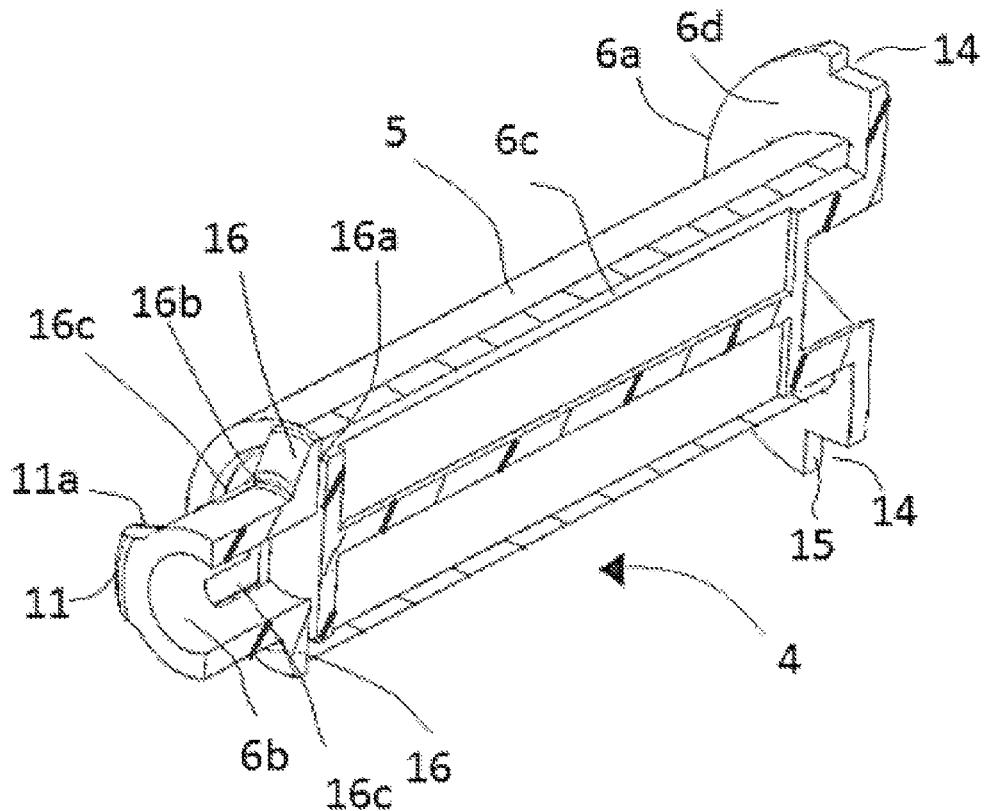
FIG. 6 shows a longitudinal section of the coupling device shown in FIG. 5.

The retention member 16 is flexible, comprises a recess 16b on a face opposite the support surface 16a of the metal tube 5, the recess 16b being arranged in the area of connection of the retention member 16 to the end 6b of the plastic body 6, as a result of which the retention member 16 may bend in relation to the recess 16b to allow the insertion of the metal tube 5. In addition, the end 6b comprises cavities 16c that pass through the plastic body 6, arranged continuous to the retention member 16, which allows the retention member 16 to be flexible and to bend. In the implementation shown in FIGS. 5 and 6, the end 6b comprises two cavities 16c, substantially parallel to each other and oriented axially, the retention member 16 being arranged between both cavities 16c.

Although in the implementations disclosed herein describe a pedal unit 1 comprising a single pedal 3, in other implementations not shown in the figures the pedal unit 1 may comprise a plurality of pedals (e.g., brake, accelerator and clutch pedals), with the coupling device including a continuous shaft, with the characteristics described herein, and with different dimensions adapted to the needs of each pedal.

What is claimed is:

1. A pedal apparatus for a motor vehicle comprising: a support piece adapted to be fixed to a part of the motor vehicle;

a shaft having an axis and comprising a plastic body made of a non-hygroscopic plastic, the shaft having a first end portion, a second end portion and a central portion disposed between the first and second end portions, each of the first and second end portions being supported on the support piece, the shaft further comprising a hollow metal body, the second end portion of the plastic body comprising a retention member that is bendable between a first position and a second position, in the first position the retention member allows an insertion of the hollow metal body onto an exterior surface of the central portion of the plastic body as the pedal apparatus is being assembled the retention member having an inner surface that is arranged substantially orthogonal to the shaft axis when the retention member is in the second position, the hollow metal body having first and second opposite ends, when the hollow metal body is inserted on the exterior surface of the central portion of the plastic body and the retention member is in the second position, the second end of the hollow metal body faces and abuts the inner surface of the retention member; and a pedal comprising a first side, a second side and a through opening that extends between the first and second sides, there being disposed and fixed in the through opening a hollow bushing, the pedal arranged on the shaft with an interior surface of the hollow bushing being rotatably supported on an external surface of the hollow metal body, the dimensional characteristics of the hollow bushing and the hollow metal body permitting the hollow bushing to rotate about the shaft.

2. A pedal apparatus according to claim 1, wherein the support piece comprises first and second spaced-apart walls oriented substantially parallel to one another with each of the first and second walls having an inner surface and an outer surface, the inner surfaces defining at least in part a housing in the support piece, the first wall having inner and outer surfaces with a first through hole extending between the inner and outer surfaces, the second wall having a second through hole extending between the inner and outer surfaces of the second wall, the first through hole and the second through hole being axially aligned with one another, the first end portion of the plastic body disposed inside and supported within the first through hole in the first wall of the support piece, the second end portion residing inside and supported within the second through hole in the second wall of the support piece.

3. A pedal apparatus according to claim 2, wherein the first end portion of the plastic body comprises at an end thereof a head that is oriented orthogonal to the axis of the shaft, the head having an inner surface and an outer surface, the inner surface facing and abutting the outer surface of the first wall of the support piece.

4. A pedal apparatus according to claim 3, wherein the outer surface of the first wall of the support piece comprises a tab and the head of the plastic body comprises a housing that extends between the inner and outer surfaces of the head, the tab situated in the housing in a manner that prevents the shaft from rotating when the hollow bushing of the pedal is rotated on the external surface of the hollow metal body.

5. A pedal apparatus according to claim 3, wherein the second end portion of the plastic body comprises a radially extending projection having a first surface facing and abutting the outer surface of the second wall of the support piece.

6. A pedal apparatus according to claim 5, wherein a portion of the second through opening in the second wall of the support piece is shaped to receive and to permit the passage of the radially extending projection.

7. A pedal apparatus according to claim 3, wherein the second end portion of the plastic body comprises a radially extending retention member having an inner surface that faces toward the inner surface of the head, the hollow metal body having first and second opposite ends, the first end of the hollow metal body facing and abutting the inner surface of the head of the plastic body, the second end of the hollow metal body facing and abutting the inner surface of the retention member.

8. A pedal apparatus according to claim 1, wherein the plastic body is hollow.

9. A pedal apparatus according to claim 1, wherein an exterior surface of the central portion of the plastic body is cylindrical.

10. A pedal apparatus according to claim 1, wherein the central portion of the plastic body comprises one or more hollow cavities.

11. A pedal apparatus for a motor vehicle comprising:
a support piece adapted to be fixed to a part of the motor vehicle, the support piece comprising first and second spaced-apart walls oriented substantially parallel to one another with each of the first and second walls having an inner surface and an outer surface, the inner surfaces defining at least in part a housing in the support piece, the first wall having inner and outer surfaces with a first through hole extending between the inner and outer surfaces, the second wall having a second through hole extending between the inner and outer surfaces of the second wall, the first through hole and the second through hole being axially aligned with one another, each of the first and second holes respectively having first and second delimiting surfaces;

a shaft having an axis and comprising a plastic body that extends between and at least partially through the first and second walls of the support piece, the plastic body having a first end portion and a second end portion, at least a part of the first end portion of the plastic body residing inside the first through hole in the first wall of the support piece, at least a part of the second end portion of the plastic body residing inside the second through hole in the second wall of the support piece, the shaft further comprising a hollow metal body inserted on an exterior surface of a central portion of the plastic body, at least a first portion of the hollow metal body being supported on the first delimiting surface of the first through hole of the support piece, at least a second portion of the hollow metal body being supported on the second delimiting surface of the second through hole of the support piece, the second end portion of the plastic body comprising a retention member that is bendable between a first position and a second position, in the first position the retention member allows an insertion of the hollow metal body onto the exterior surface of the central portion of the plastic body as the pedal apparatus is being assembled, the retention member having an inner surface that is arranged substantially orthogonal to the shaft axis when the retention member is in the second position, the hollow metal body having first and second opposite ends, when the hollow metal body is inserted on the exterior surface of the central portion of the plastic body and the retention member is in the second position, the second end of the hollow metal body faces and abuts the inner surface of the retention member; and a pedal comprising a first side, a second side and a through opening that extends between the first and second sides, there being disposed and fixed in the through opening a hollow bushing, the pedal arranged on the shaft with an interior surface of the hollow bushing being rotatably supported on an external surface of the hollow metal body, the dimensional characteristics of the hollow bushing and the hollow metal body permitting the hollow bushing to rotate about the shaft.

12. A pedal apparatus according to claim 11, wherein the first end portion of the plastic body comprises at an end thereof a head that is oriented orthogonal to the axis of the shaft, the head having an inner surface and an outer surface, the inner surface facing and abutting the outer surface of the first wall of the support piece.

13. A pedal apparatus according to claim 12, wherein the outer surface of the first wall of the support piece comprises a tab and the head of the plastic body comprises a housing that extends between the inner and outer surfaces of the head, the tab situated in the housing in a manner that prevents the shaft from rotating when the hollow bushing of the pedal is rotated on the external surface of the metal tube.

14. A pedal apparatus according to claim 13, wherein the outer surface of the first wall of the support plate comprises diametrically opposite first and second tabs and the head of the plastic body comprises first and second diametrically opposite housings that each extend between the inner and outer surfaces of the head, the first and second tabs respectively situated in the first and second housings in a manner that prevents the shaft from rotating when the hollow bushing of the pedal is rotated on the external surface of the hollow metal body.

15. A pedal apparatus according to claim 12, wherein the second end portion of the plastic body comprises a radially extending projection having a first surface facing and abutting the outer surface of the second wall of the support piece.

16. A pedal apparatus according to claim 15, wherein a portion of the second through opening in the second wall of the support piece is shaped to receive and to permit the passage of the radially extending projection.

17. A pedal apparatus according to claim 12, wherein the second end portion of the plastic body comprises a plurality of radially extending projections, each of the plurality of radially extending projections having a first surface facing and abutting the outer surface of the second wall of the support piece.

18. A pedal apparatus according to claim 11, wherein the plastic body is hollow.

19. A pedal apparatus according to claim 11, wherein the exterior surface of the central portion of the plastic body is cylindrical.

20. A pedal apparatus according to claim 11, wherein the central portion of the plastic body comprises one or more hollow cavities.

* * * * *